US010212539B2

United States Patent
Davis et al.

(10) Patent No.: US 10,212,539 B2
(45) Date of Patent: Feb. 19, 2019

(54) COMPUTERIZED SYSTEM AND METHOD FOR GENERATING AND UPDATING A MAP USER INTERFACE

(71) Applicant: EXCALIBUR IP, LLC, New York, NY (US)

(72) Inventors: Marc E. Davis, San Francisco, CA (US); Christopher W. Higgins, New Westminster (CA); Joseph O'Sullivan, Oakland, CA (US); Athellina Athsani, San Jose, CA (US); Christopher S. Jaffe, Burlingame, CA (US); Ron Martinez, San Francisco, CA (US)

(73) Assignee: EXCALIBUR IP, LLC, New York, NY (US)

( * ) Notice: Subject to any disclaimer, the term of this patent is extended or adjusted under 35 U.S.C. 154(b) by 0 days.

(21) Appl. No.: 15/640,820

(22) Filed: Jul. 3, 2017

(65) Prior Publication Data
US 2017/0303081 A1    Oct. 19, 2017

Related U.S. Application Data

(63) Continuation of application No. 11/969,815, filed on Jan. 4, 2008, now Pat. No. 9,706,345.

(51) Int. Cl.
*H04W 4/02*    (2018.01)
*H04W 4/18*    (2009.01)
(Continued)

(52) U.S. Cl.
CPC .............. *H04W 4/02* (2013.01); *H04L 67/18* (2013.01); *H04W 4/185* (2013.01); *H04W 4/21* (2018.02); *H04L 67/306* (2013.01); *H04L 67/36* (2013.01); *H04W 4/023* (2013.01); *H04W 4/027* (2013.01); *H04W 8/18* (2013.01)

(58) Field of Classification Search
CPC ......... H04W 4/02; H04W 4/21; H04W 4/185; H04W 4/023; H04W 4/027; H04W 8/18; H04L 67/18; H04L 67/306; H04L 67/36
See application file for complete search history.

(56) References Cited

U.S. PATENT DOCUMENTS

| 8,208,949 B2 * | 6/2012 | Cox | G01C 21/20 |
| | | | 340/990 |
| 2008/0065774 A1 * | 3/2008 | Keeler | G06F 17/30528 |
| | | | 709/227 |

* cited by examiner

*Primary Examiner* — Mehmood B. Khan
(74) *Attorney, Agent, or Firm* — James J. DeCarlo; Greenberg Traurig, LLP

(57) ABSTRACT

Apparatus, interfaces, and computer instructions are provided for establishing an association between a user and a declared interest, such as a brand or some other subject, and for generating a map to display the interests of one or more users. An association is established between an interest identifier, a user, and target object selected based upon an action of the user. The target object may include a location that may be specified by coordinates. The action may include selection of the at least one location by the user. Selection may include selecting a user interface feature that causes the at least one location to be selected based upon a geographical position of the user. The position may be determined by a Global Positioning System device carried by the user. Techniques are also disclosed for identifying people who are potentially interested in a given interest, or in a second interest related to a first interest, based on previously established interest-location-user associations.

14 Claims, 11 Drawing Sheets

(51) Int. Cl.
*H04L 29/08* (2006.01)
*H04W 4/21* (2018.01)
*H04W 8/18* (2009.01)

FIG. 6

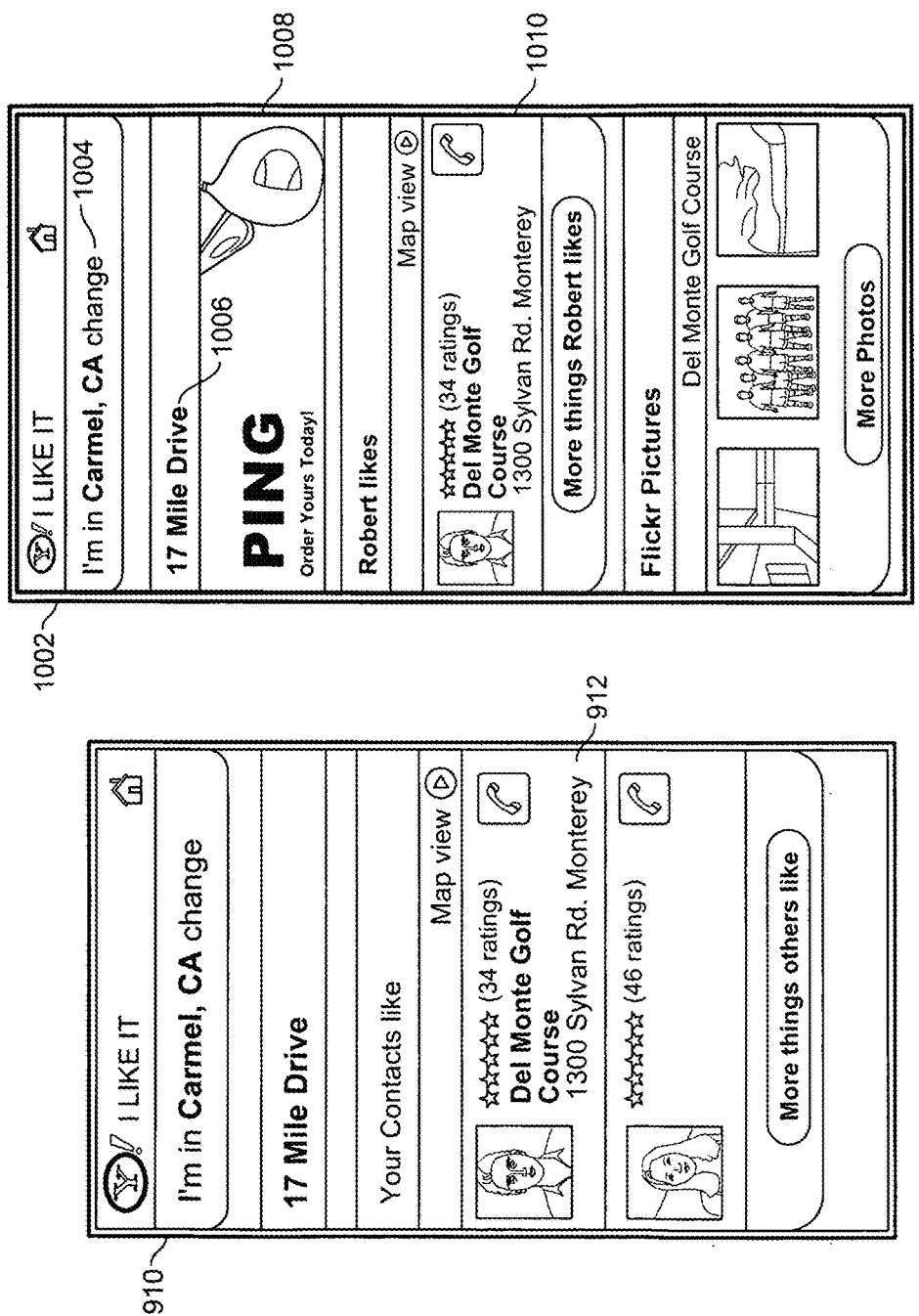

COMPUTERIZED SYSTEM AND METHOD FOR GENERATING AND UPDATING A MAP USER INTERFACE

CROSS REFERENCE TO RELATED APPLICATION

This present application is a continuation of, and claims priority from U.S. patent application Ser. No. 11/969,815, filed Jan. 4, 2008, which is related to U.S. patent application Ser. No. 11/966,972, filed on Dec. 28, 2007, which are both hereby incorporated by reference herein in their entirety.

BACKGROUND

1. Field

The present application relates generally to collection and processing of information about preferences, interests, and locations of participating users, and more specifically to collection and processing of information about user interest in particular interests, such as brands or other subjects, at particular locations and/or particular times.

2. Related Art

Association of consumer products, such as automobiles with users of web sites, and display of such associations, e.g., as part of a list in a user's online profile, is known in the art. Social networking web sites such as Facebook® and MySpace® allow a user to create an online identity that includes a user profile, and associate institutional affiliations and interests with the profile. A user may refer to a real-world object in their profile to indicate that they endorse, use, want, or own that object. The social networking sites allow multiple users to share their online identities, search for users based on interest, affiliation, and any other information stored in the identity, associate with other users, e.g., by joining a group related to a common interest, and communicate with each other by sending private messages and posting public messages. A user's affiliations and interests will then be displayed in association with the user, e.g., on the user's information page, or with messages the user posts. The user thereby shares his or her interests with other users, who may learn about the user's interests from the web site. Advertisers may then direct advertisements to particular users based on the users' interests and affiliations.

SUMMARY

In one example, computer software and/or hardware is provided for allowing people who are interested (or not interested) in particular brands, such as Apple® or BMW®, to express their interest in, i.e., opinion of, those brands by creating associations between particular brands and geographic locations. The system creates an association between the brand, the location, and the user. The association indicates that the user is interested in the brand, and that the user considers the brand to be related to a particular location. The number of users who have created the association between the brand and location may be used to identify locations that are related to the brand, and to identify opportunities for marketing and advertising the brand. User interfaces are provided to allow a user to create the brand-location association by, for example, pressing a button on a mobile device when the user is at the location to be associated with the brand. The location of the user may be automatically determined from a Global Positioning System (GPS) unit in the user's device (or other location technology).

In general, in a first aspect, the invention features a computer-readable medium comprising instructions for establishing an association between a user and at least one interest. The instructions are for receiving at least one declared interest associated with the user, receiving a target object selected based upon an action of the user, and establishing an association between the at least one declared interest, the target object, and the user.

Embodiments of the invention may include one or more of the following features. The at least one declared interest may include a person, a place, a thing, a brand, or a combination of those. The at least one declared interest may refer to a subject of interest to the user, and the at least one declared interest may include a name, a numeric identifier, or a combination thereof. The target object may include at least one location. The location may be specified by absolute coordinates, relative coordinates, name, or a combination thereof. The action may include selection of the at least one location by the user. Selection may include selecting a user interface feature that causes the at least one location to be selected based upon a geographical position of the user. The geographical position may be determined by a Global Positioning System device carried by the user. Selection may include receiving the at least one location in a user interface of a device. Selection may include receiving selection of the at least one location from a map displayed on the device.

Selection may include presence of the user within a threshold distance of the at least one location, wherein presence of the user within a threshold distance is determined based upon geographical coordinates provided by a GPS device associated with the user. The target object may include a physical object, an event, or a combination thereof. The target object may be identified by an electronic tracking device associated with the target object. The electronic tracking device may include an RFID tag. The target object may include a name, an identifier, or a combination of those. The at least one declared interest nay be selected by the user. Receiving the at least one declared interest may include retrieving the at least one declared interest from a profile associated with the user. The instructions may further be for receiving an affinity of the user for at least one interest identified by the at least one declared interest, wherein the affinity indicates whether the user likes the at least one interest.

The instructions may further be for receiving a time specifier selected based upon an action of the user, and associating the time specifier with the at least one declared interest, the target object, and the user. The time specifier may include an absolute time, a relative time, a range of time, or a combination thereof. Establishing an association between the at least one declared interest, the target object, and the user may include storing the association in a interest profile associated with the user.

In general, in a second aspect, the invention features a computer-readable medium comprising instructions for generating a map to display the interests of a user. The instructions are for receiving an association between the user, at least one declared interest, and a target object, causing display of a map of a geographical area that includes the target object, and causing display of an image superimposed on the map, wherein the image is located at a displayed position on the map, the displayed position is based upon the object, and the visual appearance of the image is based upon the at least one declared interest.

Embodiments of the invention may include one or more of the following features. The at least one declared interest may include a person, a place, a thing, or a combination thereof. The at least one declared interest may include a brand. Causing display of the image may be in response to the declared interest satisfying a filter, wherein the filter specifies at least one displayable interest, at least one displayable attention level, at least on displayable tag, or a combination thereof. The target object may include a location, and the displayed position may be based upon geographical coordinates of the location. Causing display of the interest-specific image may be in response to a display time associated with the map corresponding to an effective time associated with the at least one declared interest.

In general, in a third aspect, the invention features a computer-readable medium may include instructions for identifying a user who has potential interest in a interest. The instructions are for selecting a previously-generated user-interest association that associates the interest with a target object and an associated user; and selecting a user in response to the existence of an association between the selected user and the target object. Embodiments of the invention may include one or more of the following features. The target object may include a location, and the displayed position is based upon geographical coordinates of the location.

In general, in a fourth aspect, the invention features a computer-readable medium comprising instructions for identifying a second user who has a potential interest in a topic. The instructions are for selecting a first previously-generated user-interest association that associates a interest with a location and with a first user, wherein the interest is related to the topic, and selecting a second user in response to identifying an association between the second user and the location. Embodiments of the invention may include one or more of the following features. Identifying an association may include detecting presence of the second user within a threshold distance of the location, detecting a reference to the location by the second user, or a combination thereof. Detecting a reference to the location may include detecting a query for information about the second location.

In general, in a fifth aspect, the invention features an interface for establishing an association between a user and at least one interest. The interface includes a component for receiving at least one declared interest associated with the user, a component for receiving a target object selected based upon an action of the user, and a component for causing an association to be established between the at least one declared interest, the target object, and the user.

Embodiments of the invention may include one or more of the following features. The target object may include at least one location. 30. The action may include selection of the location by the user. Selection may comprise selecting a user interface feature that causes the location to be selected based upon a geographical position of the user, and the geographical position is determined by a Global Positioning System device carried by the user. The interface may further include a component for receiving a time specifier selected based upon an action of the user, and a component for causing association of the time specifier with the at least one declared interest, the target object, and the user.

In general, in a sixth aspect, the invention features an interface for generating a map to display the interest preferences of a user. The interface includes a component for receiving an association between the user, at least one declared interest, and a target object, a component for causing display of a map of a geographical area that includes the target object, and a component for causing display of a interest-specific image superimposed on the map, wherein the interest-specific image is located at a displayed position on the map, the displayed position is based upon the object, and the visual appearance of the interest-specific image is based upon the at least one declared interest. Embodiments of the invention may include one or more of the following features. The target object may include a geographical location, and the displayed position may be based upon geographical coordinates of the geographical location.

In general, in a seventh aspect, the invention features an apparatus for establishing an association between a user and at least one interest. The apparatus includes logic for receiving at least one declared interest associated with the user, logic for receiving a target object selected based upon an action of the user, and logic for establishing an association between the at least one declared interest, the target object, and the user.

Embodiments of the invention may include one or more of the following features. The target object may include at least one location. The action may comprises selection of the at least one location by the user. Selection may include selecting a user interface feature that causes the location to be selected based upon a geographical position of the user. The apparatus may further include logic for receiving a time specifier selected based upon an action of the user, and logic for associating the time specifier with the at least one declared interest, the target object, and the user.

In general, in an eighth aspect, the invention features a computer-enabled method of establishing an association between a user and at least one interest. The method includes receiving at least one declared interest associated with the user, receiving a target object selected based upon an action of the user, and establishing an association between the at least one declared interest, the target object, and the user. Embodiments of the invention may include one or more of the following features. The target object may include at least one location.

In general, in a ninth aspect, the invention features a computer-enabled method of generating a map to display the interest preferences of a user. The method includes receiving an association between the user, at least one declared interest, and a target object, causing display of a map of a geographical area that includes the target object, and causing display of a interest-specific image superimposed on the map, wherein the interest-specific image is located at a displayed position on the map, the displayed position is based upon the object, and the visual appearance of the interest-specific image is based upon the at least one interest identifier. Embodiments of the invention may include one or more of the following features. The target object may include a location, and the displayed position is based upon geographical coordinates of the location.

BRIEF DESCRIPTION OF THE DRAWINGS

The present application can be best understood by reference to the following description taken in conjunction with the accompanying drawing figures, in which like parts may be referred to by like numerals:

FIG. 6 illustrates user interfaces for displaying interest-related content in accordance with embodiments of the invention.

FIGS. 9A and 9B illustrate user interfaces for presenting matching interests in accordance with embodiments of the invention.

FIG. 10 illustrates an advertisement that is selected based on relevance of the advertisement to the user's declared interests in accordance with embodiments of the invention.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
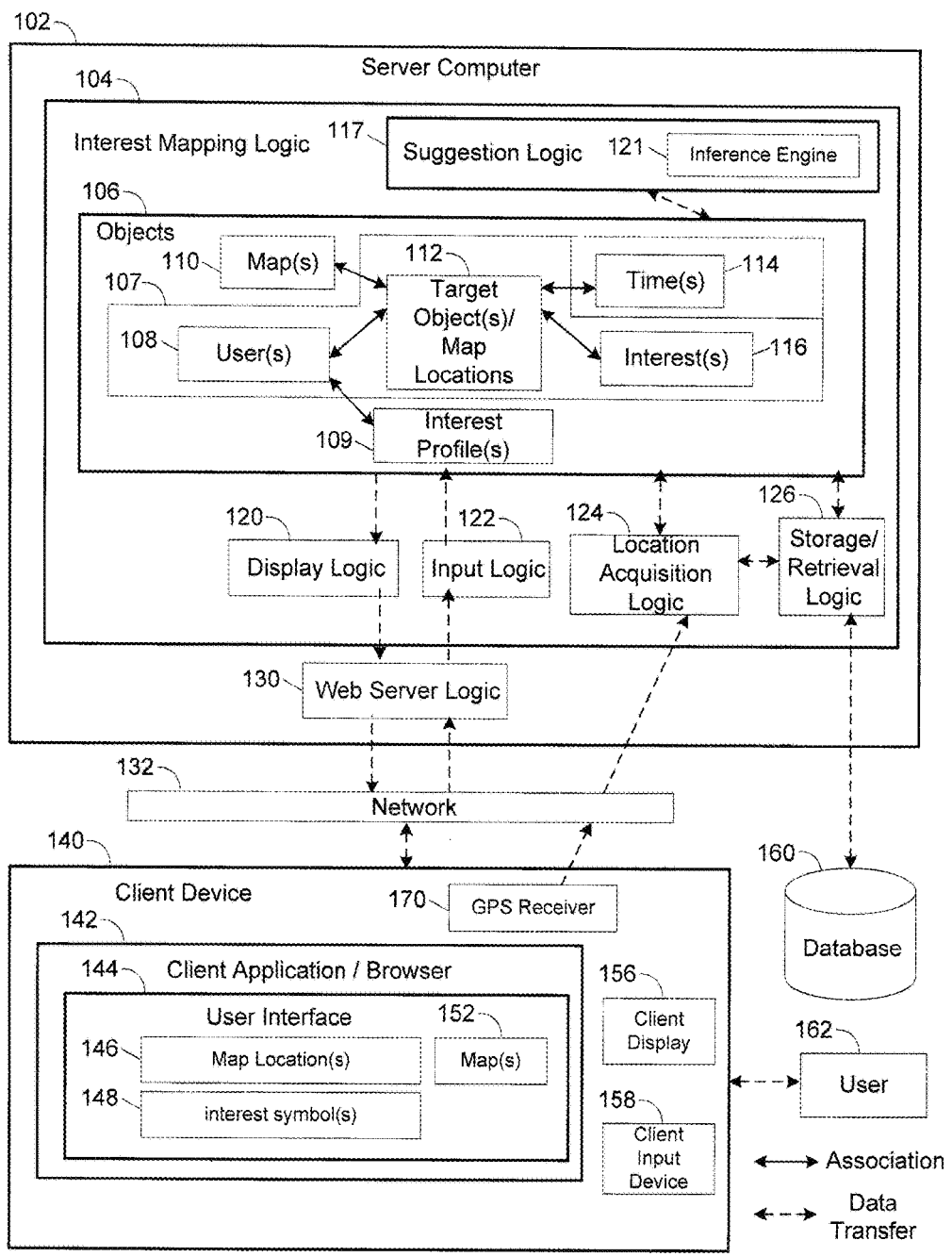
FIG. 1 illustrates a server-based interest mapping system in accordance with embodiments on the invention.

FIG. 1 illustrates a server-based interest mapping system in accordance with embodiments on the invention. In one example, a server 102 provides, e.g., executes or makes available for execution, interest mapping logic 104. The interest mapping logic 104 associates users 108 with target objects 112 and interests 116 in response to requests received from a client device 140, e.g., a mobile phone, portable computer, or other computing device, via the network 132. The requests may be generated by a web browser 130 in response to input received from a user 162 via an input device 158. The interests 116 are subjects of interest to the associated users 108. In one example, the interests 116 are brands, e.g., brand names of products, services, or companies. Example brands include Apple®, BMW®, and the like. The interests 116 may include any person, place, or thing that a user identifies as an interest. An interest identified by a user is referred to herein as a "declared interest". The unqualified term "interest" is used herein to refer to any type of interest, including interests that are declared by users, and interests that are inferred or otherwise determined for users. Examples of interests include sports players, actors, musicians, cities, tourist destinations, roads, brands, hobbies, activities, events, movies, products, services, and the like.

The interest mapping logic 104 includes objects 106, which include the users 108, the target objects 112, the interests 116, maps 110, and times 114. The objects 106 may be computer program code and/or data represented in a computer. Therefore, the users 108, target objects 112, interests 116, maps 110, and times 114 are computer-based representations of respective real-world (or virtual world) users, map locations, interests, maps, and times, respectively.

Although the interest mapping logic 104 is shown as a single component on the server computer 102 in this example, in other examples, some or all components of the interest mapping logic 104 may be located on separate computers, such as the client device 140 or other servers, and the components may communicate with each other through the network 162 using, for example remote procedure calls (RPC).

The objects 106 may represent entities in the real world or in a simulated virtual world. In one example, the objects 106 are based upon information received from the user 162, from a database 160, from another server computer, such as a map data server, or a combination of those. The objects 106 include user(s) 108, map(s) 110, map location(s) 112, time(s) 114, and interest(s) 116. Each of the objects 106 may be identified by a corresponding identifier, which may be, for example, a numeric or textual value. Each of the users 108 may be identified by a user identifier, such as a user name or user number. Each of the interests 116 may be identified by an interest identifier, such as a name of the interest or a number that corresponds to the interest. The interest mapping logic 104 may establish an association 107 between a particular user 108, one or more map locations 112 (or other target objects 112, such as physical objects that remain stationary or move), and one or more interests 110 to indicate a relation between that user, location(s), and interest(s). The target objects 112 represent objects in the real world (or in a virtual world), such as locations or things that may be fixed in space, or that may move over time. The association 107 may further include or be associated with one or more time(s) 114 at which the association is effective, to indicate that the relation is effective at or during that time. In one example, an interest map is associated with a display time, which may be, for example a time at which the map is displayed, or a time associated with the map (e.g., night time or day time). Information about the interest, e.g., the interest's symbol, will then be displayed on the map only if the display time corresponds to an effective time associated with the association (or interest). A display time corresponds to an effective time if the display time is equal to the effective time, is within a predetermined range of the effective time, or is within a range specified by the effective time.

The dashed line around the time(s) 114 indicates that the time(s) 114 is an optional part of the association 107. Multiple users may be associated with each location, interest and/or time, although the examples herein focus on a single user for clarity of explanation. The user(s) 108 may be omitted from the association 107, for example, if the association is created by an anonymous user, or if the association is created without reference to a user (e.g., by an automated system such as a rule engine).

In one example, the user(s) 108 represent human users of the interest mapping logic 104. The maps 110 represent geographical regions and associated features, such as roads, buildings, and so on. In one example, the target objects 112 represent specific places or points in space, and may be, for example, geographic coordinates, such as a latitude, longitude pair, or a path or region defined by a list of latitude, longitude pairs. That is, the target objects 112 specify the positions of physical locations on the maps 110. In other examples, the target objects 112 may represent any object, i.e., a "target object", which may or may not be a physical object. In other examples, the target object may be an event that may or may not be associated with a physical location. The term "map location" is used herein as an example, and "target object" may be substituted for "map location". The map 110 may be rendered graphically on the client display 156, and the target objects 112 may be rendered on the map 110, e.g., as icons or as displayed features with associated symbols or text. The times 114 represent time values, e.g., hours, minutes, and seconds, or seconds since an epoch date, which may be associated with the target objects 112. The times 114 may include absolute or relative time values, periodic time values, e.g., every day at 6:00 PM, ranges of time, e.g., 1:00 PM to 2:00 PM, or a combination of those.

The interest(s) 116 may be, for example, numeric or string identifiers that refer to subjects of interest. For example, the interest 116 may be a name of a commercial brand, e.g., a name of a person, place, thing, company, product, or product line, or any other name that represents an entity, such as a trade name or trademark. Examples of brands include Coca-Cola®, Apple®, BMW®, and the like. The interest 116 may be a trademark, e.g., a name, or symbol, or a combination of those that indicates the source of goods or services. In another example, the interest may be a name and/or symbol of a person or other entity.

As introduced above, the interest mapping logic 104 may establish an association 107 between a particular user 108, map location 112, and interest 116 to indicate a relation between that user, location, and interest. The association 107 may further include or be associated with a time at which the association 107 is effective, to indicate a time at or during which the relation is effective. In one example, the association 107 is created in response to receipt of at least a map location and/or interest by the interest mapping logic 104. The map location and/or interest may be received by the server computer 102 from the client device 140 or similar device in communication with the server computer 102 via the network 132. The client device 140 collects information such as the map location, the interest, the user, and the time, and sends the information that it collects to the interest mapping logic 104 via the network 132. In one example, a user presses a button on the client device to cause the user's present location to be associated with a particular interest and with the user. This example is a form of active collection, in which the user issues a command to create the association 107, or otherwise explicitly causes the association 107 to be created. A specific interest may be selected by the user, e.g., by pressing a button that corresponds to the interest, such as an Apple® button that causes the user's current location to be associated with the Apple® brand. In another example, the client device 140 automatically sends the user's location to the server computer 102 as the location changes and/or at periodic intervals. This automatic marking is a passive collection mode that may be chosen by a user if, for example, the user wishes to create a trail of locations visited without explicitly issuing commands to create the associations 107. In one example, the user's current location is determined based upon coordinates provided by a GPS receiver 170 associated with the client device 140 carried by the user. The coordinates are sent via the network 132 to the server computer via the network 132. Location acquisition logic 124 located on the server 102 receives the location and creates or updates a corresponding map location object 112.

The interest mapping logic 104 may receive an affinity value associated with the interest 116. The affinity value may be positive, which indicates that the user likes the interest, or negative, which indicates that the user does not like the interest. In another example, the affinity value may be a positive number to indicate a degree to which the user likes the interest on a numeric scale, or a negative number to indicate a degree to which the user dislikes the interest on the numeric scale.

As an example, the beer company Samuel Adams® may sponsor a contest in which users are asked to find the places in Boston that are most like Samuel Adams® or represent Samuel Adams®. A user enters the contest and provides a list of locations that the user visits in a pre-game ritual prior to a Boston Red Sox™ baseball game. The user has therefore indicated that he or she thinks the locations in the list are like Samuel Adams®. The interest mapping logic 104 then creates an association 107 between the user, the location, and the interests Boston Red Sox™ and Samuel Adams® for each entry in the user's list of locations. For example, if the user's list includes Fenway Park, an association is created between the user, the location of Fenway Park, the Boston Red Sox, and Samuel Adams®. Associations 107 may be created in this way by receiving locations and interests from multiple users. The locations most strongly associated with particular interests may then be determined based on the relative number of associations 107 for each location. Knowledge of locations and/or interests with large numbers of associations 107 is likely to be of interest to the owners of the interests and related interests, and to advertisers.

An interest map may be generated showing the locations provided by the user. The interest map may be, for example, a map of Boston showing a Boston Red Sox™ symbol and a Samuel Adams® symbol at each location in the user's list of locations. The associations 107 may be used for purposes other than generating maps. For example, if the interest is the Samuel Adams® brand, a list of locations that are associated with the Samuel Adams® brand may be generated by selecting the locations associated with Samuel Adams®.

As another example, a user may be driving their car on a stretch of a scenic highway, e.g., Highway 1, and may think that the road is very enjoyable. The user may further think that the road would be of interest to other drivers, particularly to drivers of the brand of car driven by the user. For example, the user may be driving a BMW® automobile and may wish to mark the road as an excellent BMW® driver's road. The user then presses a button on the client device 140 to create the interest-location association 107. The interface may be simple, involving only a button press, or may be more complex, involving collection of specific information from the user. In the simple case, one button may be provided, where pressing the button causes the user's identity (if available) and present location, retrieved from a GPS receiver 170, to be transmitted to the interest mapping logic 104. The interest mapping logic 104 may infer that the interest the BMW® brand by deducing that the user is driving on a road, based upon the user's location and/or velocity as provided by a stream of GPS coordinates. The interest mapping logic 104 may then consult the interest profile 109 to determine the type of car the user drives, and associate that brand with the user and the location. The interest profile 109 may be referred to as a brand profile in cases such as this example, where the interest is a brand. In a more complex example, the user may indicate that the start of the road marks the beginning of a path to be associated with the user and the BMW® brand. A user interface 144 displayed on the client device 140 may provide options for marking the start and end of a path. When the user reaches the end of the exciting portion of the road, the user may indicate that the end of the path has been reached. The path, i.e., route, would then be associated with the user and the brand. In another example with a more complex user interface, the user provides the brand as well as the location, e.g., by selecting the brand from a list of brands, entering the brand name, or selecting a button that corresponds to the brand. Once the association 107 between the brand and the location is known, inferences can be made. For example, the route is known to be liked by BMW® drivers, and furthermore, the route may be of interest to drivers of other brands of cars, and particularly to car enthusiasts. Although the person who created the association 107 has not indicated that they are a car enthusiast, they may be, because they created the association 107 between the car brand and the route. The fact that a location is associated with a brand can be monetized, e.g., suggested and/or sold to interested parties such as the brand's owner and/or the brand's competitors, because the owner and/or competitors may find that fact to be valuable for advertising or marketing purposes. The associations 107 between users 108, locations 112, and interests 114, and the information in the users' interest profiles 109, may be used to make suggestions to users about other locations or interests that may appeal to the users, or other users that may share common interests. These associations 107 may also be used to generate suggestions for brand owners, competitors, and potential advertisers, particularly when a substantial number of associations 107 have been received (e.g., 100 associations or more for the same brands and/or locations). In one example, these suggestions are generated by suggestion logic 117 based on the objects 106 and the associations 107 between the objects 106 of FIG. 1.

The suggestion logic 117 may generate suggestions, which may be textual messages for viewing by users, or objects with defined elements, for use by data processing or data mining systems. In one example, the suggestion logic 117 operates according to a set of rules for generating suggestions if certain conditions are true. Optionally, the suggestion logic 117 may include an inference engine 121, which may use rules to make suggestions as known to those skilled in the art. The rules used by the suggestion logic 117 may be based on one or more of the following logical statements. If a user is associated with a declared interest and a location, then when a second user is in the location, the second user may also be interested in the declared interest. That is, a second user may be identified by identifying a previously-generated association that associates the declared interest with a location and an associated user, and selecting a second user as the potentially interested user if there is an association between the second user and the location.

Interests may be related to other interests, and the degree of relation may be quantified by a numeric value. The relation may be any type of relation between two objects that can be expressed as a Boolean value (related or not related) or a numeric value that indicates the strength of the relation. The type of relation may depend on a type or category of the interests being compared. For example, for places, the relation may be a distance relation, and closer geographic locations are more strongly related than locations that are farther apart. For things, the relation may be determined by a table of similar things or topics, or by words that often appear together in sentences or in dictionary definitions. For example, the object "car" may be strongly related to the object "driving" because a predefined table indicates that "car" is related to "driving", or because the term "car" is found in the definition of "driving", or the terms "car" and "driving" are known to often appear together in sentences. For people, the relation may be quantified by the distance between two people in a social network graph, so that, for example, two people that know each other directly are strongly related, while two people that do not know each other directly but both know a common person are not as strongly related. In one example, the strength of a relation between two interests may also be quantified based on the number of users who are associated with both interests. Two objects may be considered related if the strength of the relation is greater than a defined threshold value.

In one example, if a declared interest, such as "driving", is related to another declared interest, e.g., cars, then if a second user is in a location associated with the declared interest, the second user may be interested in the second interest. That is, the second user may be identified by selecting a first previously-generated user-interest association that associates a first interest with a location and first user, wherein the first interest is related to the second interest (e.g., cars are related to driving), and selecting a second user if an association is "detected" between the second user, the location, and the second interest. Detection of an association may include detection of presence of the second user within a threshold distance of the location, detection of a reference to the location by the second user, or a combination thereof. Detection of a reference to the location may include detection of a query for information about the second location.

Knowledge of associations between interests and locations may be valuable to companies or individuals that are related to that interest, such as companies that sell products or services in a field related to the interest, or, if the interest is a brand, to companies that own or compete with the brand. If a location is associated with a brand and an interest, that fact can potentially be monetized to the brand's owner or competitors, because the owner and competitors may find value in the fact that the brand is associated with the interest and the location.

Communication between the client device 140 and the server computer 102 may be in the form of messages, e.g., HTTP request messages generated and sent by the client application or browser 142 to a web server address associated with the server computer 102. The client application or browser 142 may store information such as a user identifier, a map location, an interest, and a time specification, or a combination of those, in the HTTP request message. The HTTP request message also identifies the message as an interest association message to be processed by the interest mapping logic 104. Web server logic 130 receives the HTTP request and forwards it to the interest mapping logic 104, which includes input logic 122 that extracts the information, e.g. the user identifier, the map location, the interest, the time specification, or a subset thereof. The web server logic 130 sends and receives HTTP messages according to the HTTP (Hypertext Transfer Protocol) specification. The interest mapping logic 104 processes the request, e.g., by creating objects 106 as necessary, creating associations 107 between the objects, storing the objects and associations in the database 160, making suggestions based on the objects (as described below), and generating user interface screens or images. The interest mapping logic 104 may generate output, such as map annotations for displaying the interests on the map(s) 110, e.g., as icons that show the interest name or symbol, e.g., a brand name or symbol, in the location associated with the interest, or suggestions based upon the interest associations 107. The output may be sent to the client device 140 by display logic 120, which formats the output into an HTTP response message and forwards the response message to the web server logic 130, which sends the response message via the network 132 to the client device 140. The client device 140 may display the output on the client display 156.

In one example, the user may also enter the name of the interest, the location, and the time, e.g., by typing a brand name on the device 140 or at a computer keyboard. In another example, the interest may be determined automatically by logic on the client device 140 or by the interest mapping logic 104. For example, a user interest profile 109 may be associated with the user, and the user interest profile may specify a default interest, e.g., BMW®, which is associated with the user's present location when the user selects a command to associate an interest. In another example, the user profile may be configured to indicate that the brand BMW® is to be associated with the user's location if the location is a road or highway.

In one example, the user identifier may be unavailable, i.e., unknown. For example, the user may decline to provide the user identifier when creating an association 107 between a location and a interest, or the request to create the association may be generated by a user who is not logged in and hence has not provided a user identifier. If the user identifier is not available, the association 107 is established between the information that is available, e.g., the interest, location, and optional time, without the user identifier.

If the user identifier is received or otherwise known, the corresponding user 108 is included in the association 107. That is, the association 107 is created between the user, the location, and the interest. If a time specifier is received, the corresponding time 114 is included in the association 107. That is, the association is created between the user, the location, the interest, and the time, or, if the user is not received, between the location, the interest, and the time.

The association 107 is represented in FIG. 1 by arrows between the boxes that represent the users 108, target objects 112, times 114, and interests 116. The association 107 may be stored as, for example, an entry in a database table that refers to identifiers that represent the particular user, map location, interest, and (optional) time. In one example, the association 107 is stored in an interest profile 107 associated with the user 108. For example, if the user corresponding to identifier U1 is to be associated with the map location L1 and the brand B1, then an entry may be added to a database table that represents an association 107, where the entry includes the values U1, L1, and B1. An interest profile 109 may be created with a reference to that association, or the interest profile 109 may itself include a representation of the association, e.g., the values U1, L1, and B1. If the user is to be associated with the location and interest during a specified time or times, then the entry includes U1, L1, B1, and T1, where T1 represents the specified time. Other implementations are possible, e.g., by creating pointer or reference links in the computer memory to link the associated objects. In this example, a user object would include a set or list of object reference that point to an associated map location object, an associated interest object, and, optionally, an associated time object. In another example, the association 107 may be represented by an association object, which includes object references that point to the user object, map location object, interest object, and optional time object for which an association is to be established.

The client device 140 may display information provided by the interest mapping logic 104 and received via the network 132 from the server computer 102. The client device 140 may execute computer program code received from the server computer 102, such as user interface code that generates a user interface 144 for display on a client display 156, e.g., an LCD screen or the like. The interest mapping logic 104 may provide user interface components, e.g., HTML pages, JavaScript™ components, widgets implemented in JavaScript™ or another programming language by making the user interface components available to the web browser or client application 142 located on the client device 140. The interest mapping logic 104 may transmit the components of the user interface 144 to the client 140 via the computer network 132. The user interface 144 may be displayed on the client display 156 by the Web browser or client application 142 for use by a user 162, who may provide input to the user interface 144 via an input device 158.

In one example, the user interface 144 displays maps 152, and overlays interest symbols 148 or other interest identifiers, such as interest names, on the map at locations specified by map locations 146. In other examples, the user interface 144 displays the map locations 146 and interest symbols 148 independently of any maps. For example, the map locations 146 and interest symbols 148 may be displayed in a list form.

The interest mapping logic 104 may store and retrieve associations 107 in a database 160 using storage/retrieval logic 126. The database may be, for example, Oracle® or the like, and may provide persistent storage of the associations 107 and the objects 106, including users 106, target objects 112, interests 116, and maps 110.

The life cycle of the associations 107 may be divided into stages, which include a first monetization stage, a collection stage, an aggregation and processing stage, a filtering stage, and a second monetization stage. The first monetization stage involves initial activities performed before the associations have been collected. These activities may be, for example, creating and funding a contest or promotion that encourages users or potential users to create associations 107, as described in the Boston Red Sox™ example above. The collection stage includes receiving information for creating associations 107, e.g., receiving messages from the client device 140, or receiving messages or other input from a client computer or web browser. For example, a user may drag a brand symbol onto a map to associate the brand with a map location, or may press a button on the device 140, or may enter information about the brand and/or location into the device 140. In another example, the user may place an RFID tag or similar electronic tracking device on an object to create an association between the object's location, the user, and an interest. The aggregation and processing stage includes adding, summing, or otherwise evaluating the associations 107 received in the collection stage to generate information such as statistics or rankings of interests, locations, and/or users by the number of times each has been included in an association 107.

The filtering stage includes selecting entries from the associations 107 that meet certain criteria. The filtering stage may identify a subset of the associations 107 by selecting associations that are related to particular locations, interests, and/or users. Associations may be selected and displayed based on attention, interests, brands, and/or tags specified in a user's interest profile 109 and/or in the interest profiles of one or more other users. Attention may be expressed as a location and an attention level that quantifies the amount of attention users have given to that location, e.g., by taking photographs at the location, or by viewing information related to the location, or by otherwise directing attention at a location in a way that can be quantified. A user's interest profile may then specify the locations in the real (and/or virtual0 world that have received the user's attention, and the level of attention that the user has given to each location. The attention of multiple users may be aggregated to determine a popularity ranking of locations. A user's interests may be included in the user's interest profile 109 as described elsewhere herein, and may include brands that interest the user. A user's interest profile may also include tags, e.g., text strings, associated with locations, interests, and other entities. The tags may describe the locations or may provide meanings or synonyms for the locations. In one example, a map may be generated for displaying the declared interests of user at the geographic locations associated with the interests. The number of declared interests may be large, and may be reduced by filtering out declared interests that have specified attention levels, interests (e.g., brands, and/or tags). For example, an interest map may be generated to display the interests of the user in the state of Texas. If the user is interested in food (e.g., because food is a specified interest in the user's interest profile), then a large number of restaurants and food-related businesses may be displayed on the interest map of Texas, particularly if the user has previously visited Texas and created interest-location associations. The number of declared interests to be displayed on the interest map may therefore be reduced by filtering the displayed interests. For example, a filter could be specified with minimum and maximum values for the attention level, particular types of interests and/or a maximum number of interests, and particular tags. Then interests that match the filters would be displayed on the interest map, and interests that do not math the filters would be omitted from the map. In one example, a filter may specify a minimum attention level, a set of brands to include or exclude, and/or a set of tags to include or exclude, and the interests that meet those conditions would be displayed at their corresponding locations on an interest map.

The subset may include, for example, associations 107 that are related to a particular user and a particular general location, e.g., associations for which the user is Paris Hilton and the location is in New York City. The subset may also be selected based on the user, interest, time, and/or location of each association 107. The subset may then be used to generate a map of interests and locations in New York City that are related to Paris Hilton, e.g., by having a user or interest equal to "Paris Hilton". Associations that have certain times may also be selected. For example, the locations and corresponding interests in New York City related to Paris Hilton may be further filtered by selecting only associations that have a time between 6:00 PM and 3:00 AM to generate a map of Paris Hilton's New York City nightlife locations and interests. In another example, associations that have a time between 8:00 AM and 5:00 PM could be selected to generate a map of Paris Hilton's New York City during the day.

In another example, users may associate certain locations with Grey Goose™ vodka. A brand map for the Grey Goose™ brand may then be generated by filtering the associations to select the associations that are in a particular geographical area, e.g., Manhattan. Users may have the Grey Goose™ vodka brand in their user profile or brand profile, and when such users visit a nightclub, an association may be generated between Grey Goose™ vodka, the nightclub, and the user.

In another example, selecting associations 107 for a particular location produces a list of users and interests associated with that location. If two interests are associated with the same location and/or users, then those two interests are likely to be related as common interests of users. These two interests are said to be "co-occurrences". Co-occurrences may be selected by selecting two specific interests, e.g., BMW® automobiles and Apple®. A co-occurrence map that displays locations associated with both interests may then be generated. If the number of associations 107 for a location and/or user that have one of two (or more) interests is relatively large (e.g., 100 or more), then the relation between those interests is stronger. That is, the strength of the relation between the interests may be measured by the number of associations with a common location and/or user that include one of the interests. For example, if a location is associated with both Apple® and BMW® automobiles, then a suggestion could be made that Apple® and BMW® should create advertisements featuring both brands.

Figure 2:
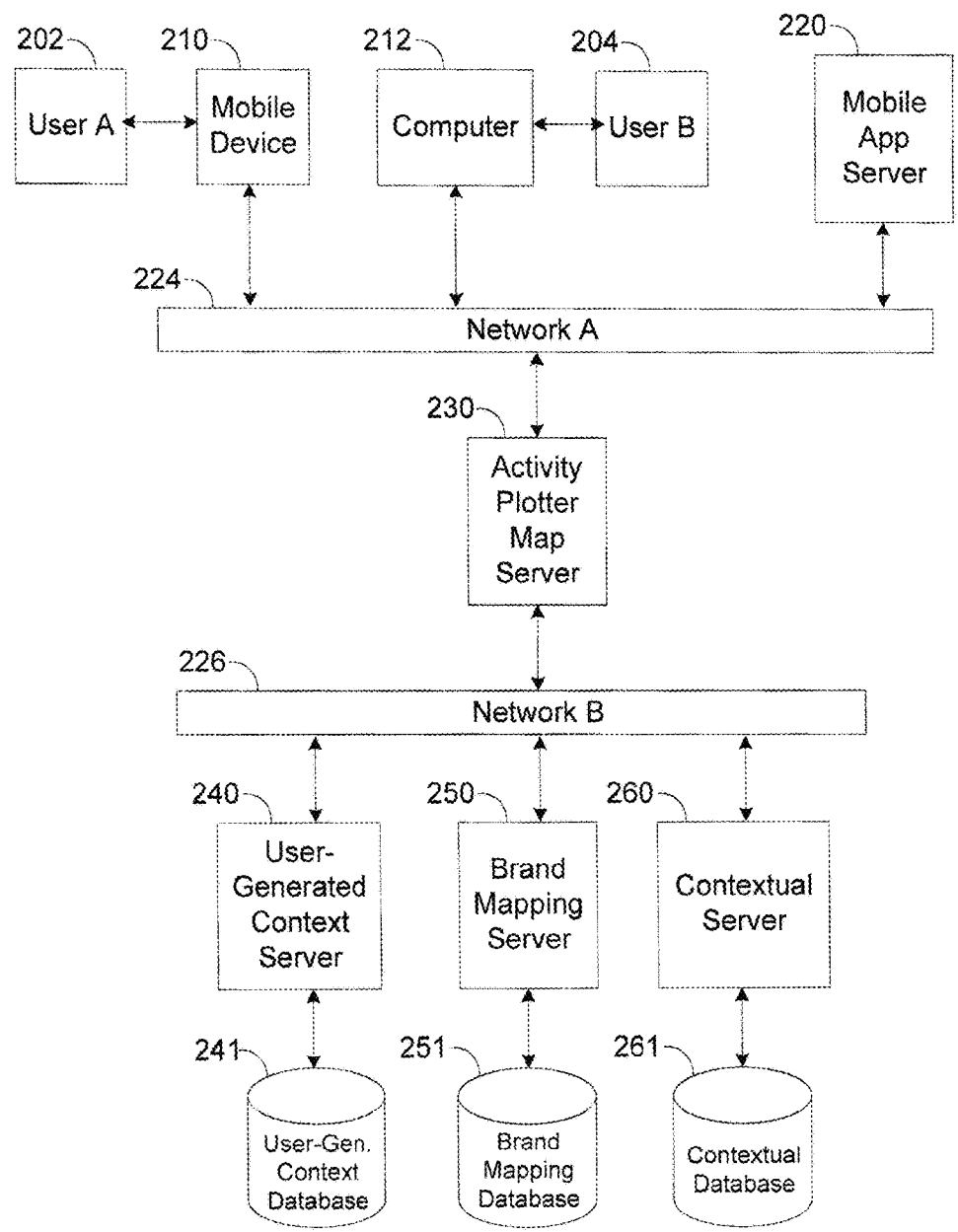
FIG. 2 illustrates an interest mapping system in which server logic is distributed across multiple server computers in accordance with embodiments of the invention.

FIG. 2 illustrates an interest mapping system in which server logic is distributed across multiple server computers in accordance with embodiments of the invention. User A 202 interacts with a mobile device 210, e.g., a cellular phone or portable computer, which communicates with a mobile application server 220 and an activity plotter map server via a network A 224. User B 204 is another user who interacts with a computer 212, which communicates via the network A 224 similarly to the mobile device 210 (although possibly using different network protocols). The mobile application server 220 forwards requests from the mobile device 210 and/or computer 212 to a network B 226, and the requests are further processed by a user-generated context server 240 for user-generated context information such as reviews and ratings of a location, by an interest mapping server 250 for storing and retrieving user-object-interest associations, and a contextual server 260 for storing general information about locations.

Figure 3:
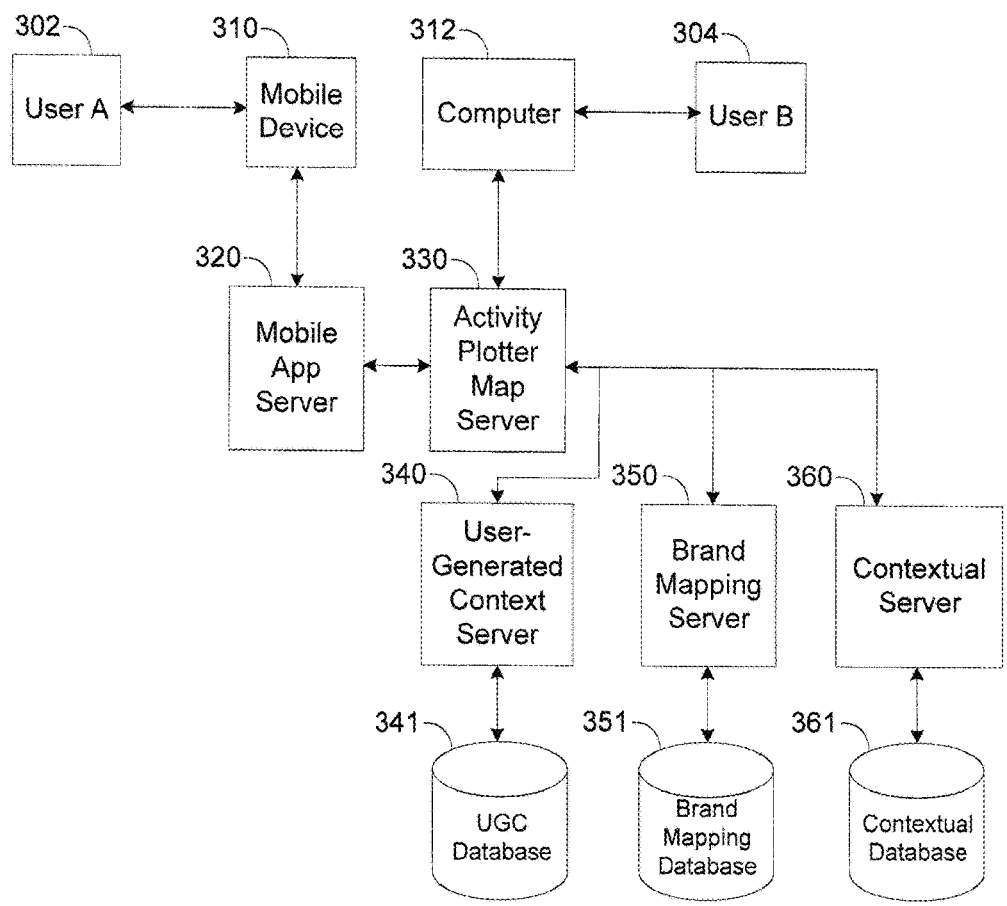
FIG. 3 illustrates operations in an interest mapping system in accordance with embodiments of the invention.

FIG. 3 illustrates operations in an interest mapping system in accordance with embodiments of the invention. In an exemplary scenario, User A 302 configures a mobile device 310 to track location and activities. An application located on the mobile device 310 sends the GPS coordinates of the mobile device 310 to the mobile application server 320. The server 320 sends the coordinates to the activity plotting map server 230. The mobile server 320 queries a contextual information server 360 for general information on the coordinates, e.g., the names and types of businesses near the location. Based on the contextual information, the mobile server 320 queries an interest mapping server 350, which identifies the user's interest profile. Based on information received from the mobile device 310, the application tracks the amount of time spent at the contextual geographical location and determines if the location is contextually relevant to the user. Contextual relevancy is described in U.S. patent application Ser. No. 11/966,972, which is hereby incorporated by reference herein in its entirety. If the location is contextually relevant to the user, then the application will, upon the user arriving at or entering the location, push relevant information from the user's interest profile for display on an interest map, display related information provided by other users (retrieved from the user-generated context server 340) in the same interest map, and allow the user to enter and/or upload user-generated context information related to the location, activity, or target object to be tracked on the interest map.

In one example, upon the user's departure from the location, the activity plotter map server 330 registers the location as a place of interest for the user and includes that fact in the interest map and/or interest profile. Upon departure, the activity plotter map server 330 also prompts the user to enter user-generated context information about the location or target object, about the interest, about activity at the location, or a combination of those. The user-generated context information is then stored in the user-generated context database 241 by the user-generated context server 340. If the user-generated context information includes a interest, or the user has otherwise provided an interest, an association between the location (or target object), the interest, and the user is stored in the interest mapping database 351 by the interest mapping server 350.

Figure 4:
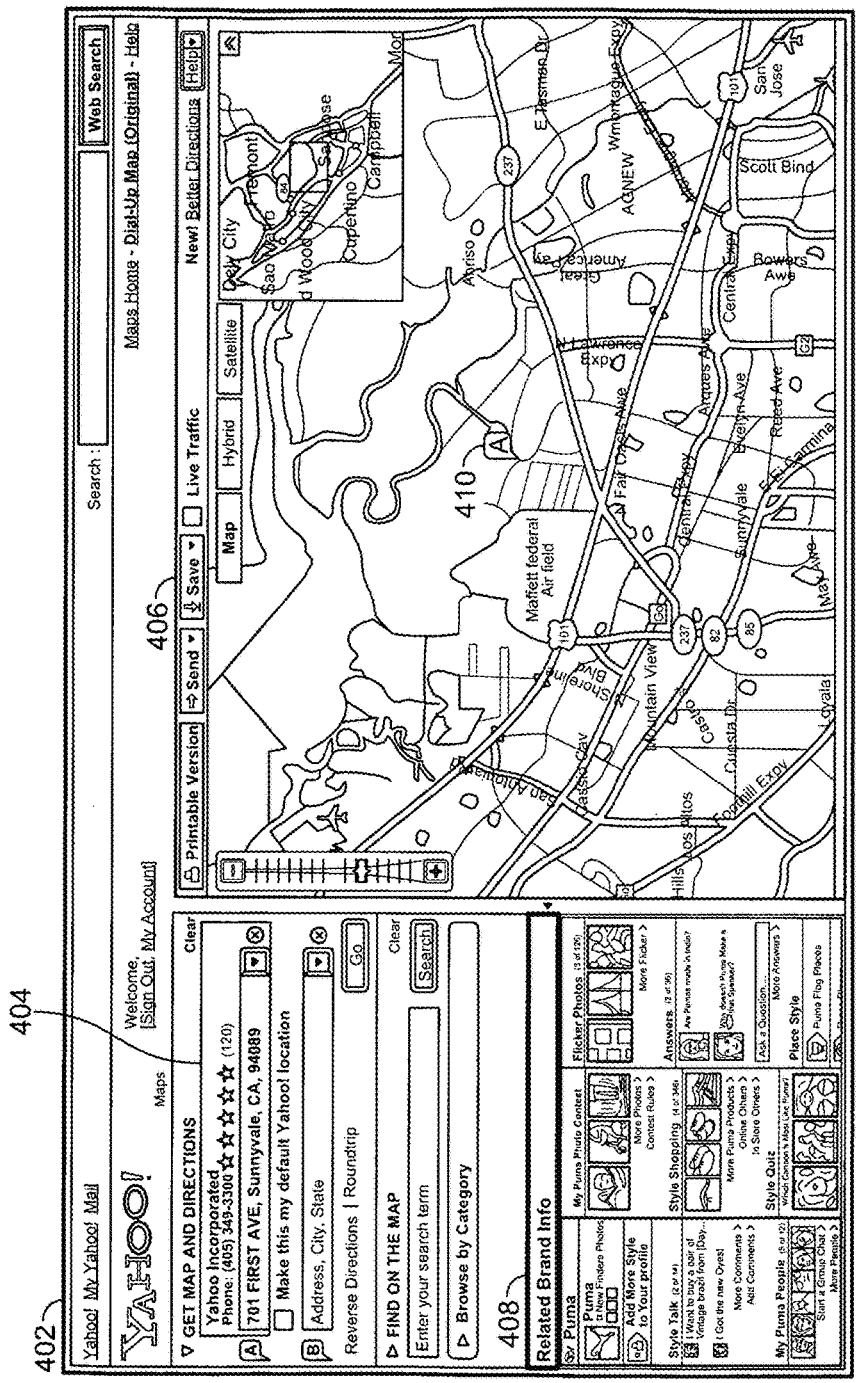
FIG. 4 illustrates an interface for displaying interest information produced by a search in accordance with embodiments of the invention.

FIG. 4 illustrates an interface for displaying interest information produced by a search in accordance with embodiments of the invention. A user interface 402, which may be displayed on a client computer or mobile device, shows a location query text box 404 in which the address of a location has been entered. A map 406 displays a location indicator 410 that indicates, e.g., displays or points to, the location on the map. A related brand info panel 408 displays brand information related to the location, e.g., brands that have previously been associated with the location by users. In this example, the brand Puma® is associated with the location, and information about the Puma® brand is displayed in the panel 408, including a symbol of the brand, text messages related to the brand, and photos related to the brand. The panel 408 also includes an input component that allows users to select cartoons that they consider to be most like the Puma® brand. The panel user interface component 406 receives a selected cartoon, which corresponds to a target object, and causes an association between the cartoon object with the brand to be created. In one example, the related brand information displayed in the panel 408 is information in the user's brand profile.

Figure 5:
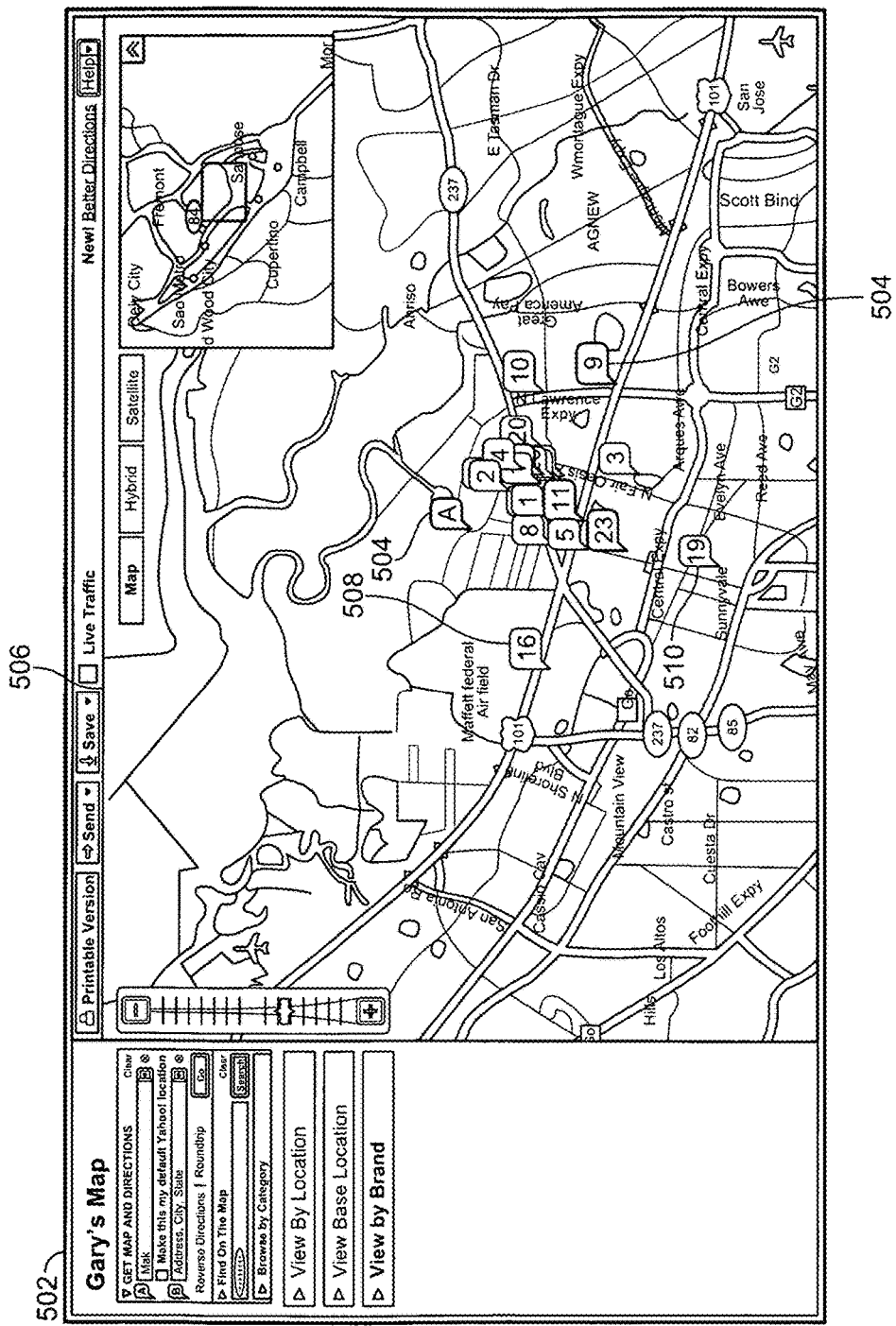
FIG. 5 illustrates an interface for displaying a user's interest map in accordance with embodiments of the invention.

FIG. 5 illustrates an interface for displaying a user's interest map in accordance with embodiments of the invention. A map display 502 includes a brand map 506 on which locations associated with brands are displayed. The appearance, e.g., color or shading, of location indicators 504, 508, 510 is based on the degree of relevancy of the brands associated with the corresponding location to the user. Two locations 504 are associated with brand(s) that are closely related to the user, e.g. have a strong affinity with the user. The close relation is indicated by the dark color or shading of the location indicators 504. Two other locations 508, 510 are associated with brands that are more distantly related to the user. The more distant relation is indicated by the light color or shading of the location indicators 508, 510.

Figure 6:
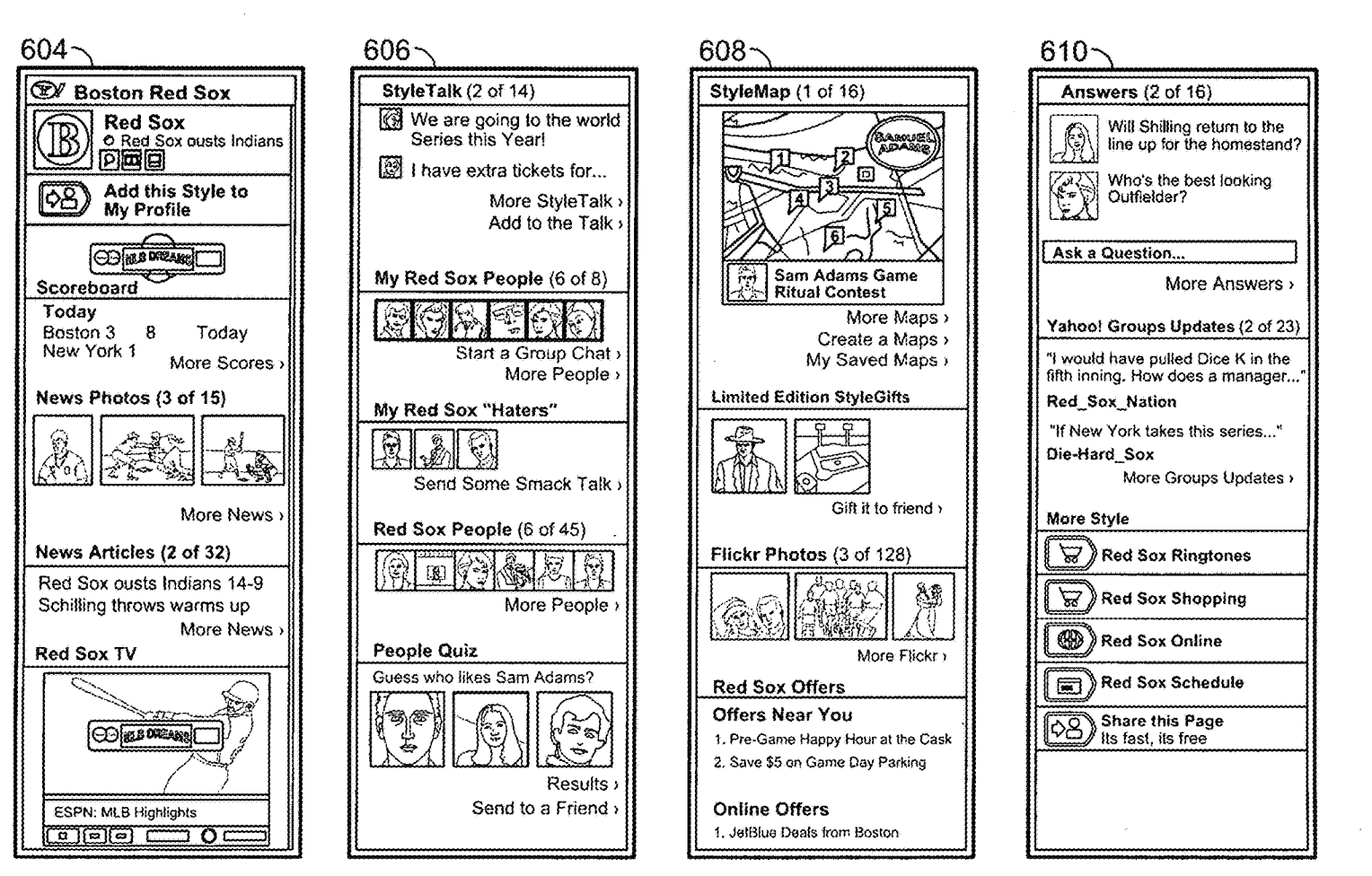

FIG. 6 illustrates user interfaces for displaying interest-related content in accordance with embodiments of the invention. When a user accesses interest information on a mobile device, the user interfaces 604, 606, 608, and 610 may be displayed on the mobile device. A first interface 604 displays content directly related to the user's favorite interest(s). The second interface 606 displays content related to other users who are interested in the user's favorite interest(s). The third interface 608 and fourth interface 610 display content that is related to the user's favorite interests and provided by a content provider such as Yahoo!® Inc.

Figure 7:
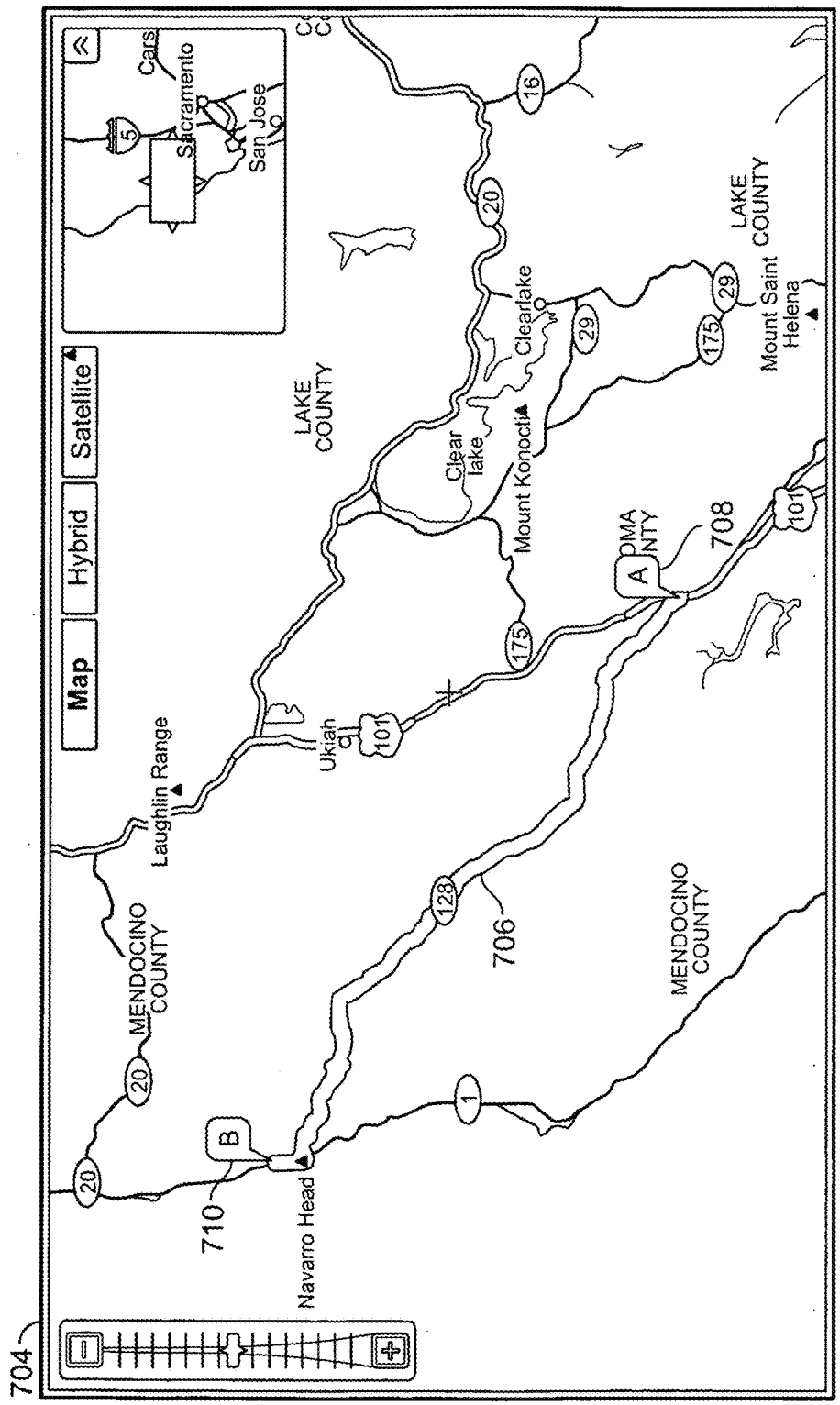
FIG. 7 illustrates user interfaces for displaying an interest map for a route in accordance with embodiments of the invention.

FIG. 7 illustrates user interfaces for displaying a brand map for a route in accordance with embodiments of the invention. In one aspect, a brand map is a type of interest map that displays locations associated with brands, which are a type of interest. The user interface displays a geographical brand map 704. The map 704 shows that a brand, e.g., BMW®, is associated with a route 706 that starts at a first location 708 and ends at a second location 710. The association may have been established by a user driving from point A to point B, who indicated that the points on the path between points A and B are associated with the BMW® brand. Other users may then search for brand maps related to the BMW® brand or to the geographic location of the map, and the brand map 704 will be returned as a search result. The relevancy of the route 706 will increase in proportion to the number of users who associate the same route, or a portion thereof, with the same brand, e.g., BMW®. In one example, a button user interface component located on the mobile device may receive input from the user when the user is in a location to be associated with the BMW® brand. Another user interface component located on the mobile device may also receive the name of the brand, e.g., BMW®, from the user, via a menu or text entry, for example. The user interface on the mobile device then sends a message to the server computer 102 to cause the brand mapping logic 104 to associate the selected brand with the selected location and the user of the mobile device.

Figures 8A, 8B:
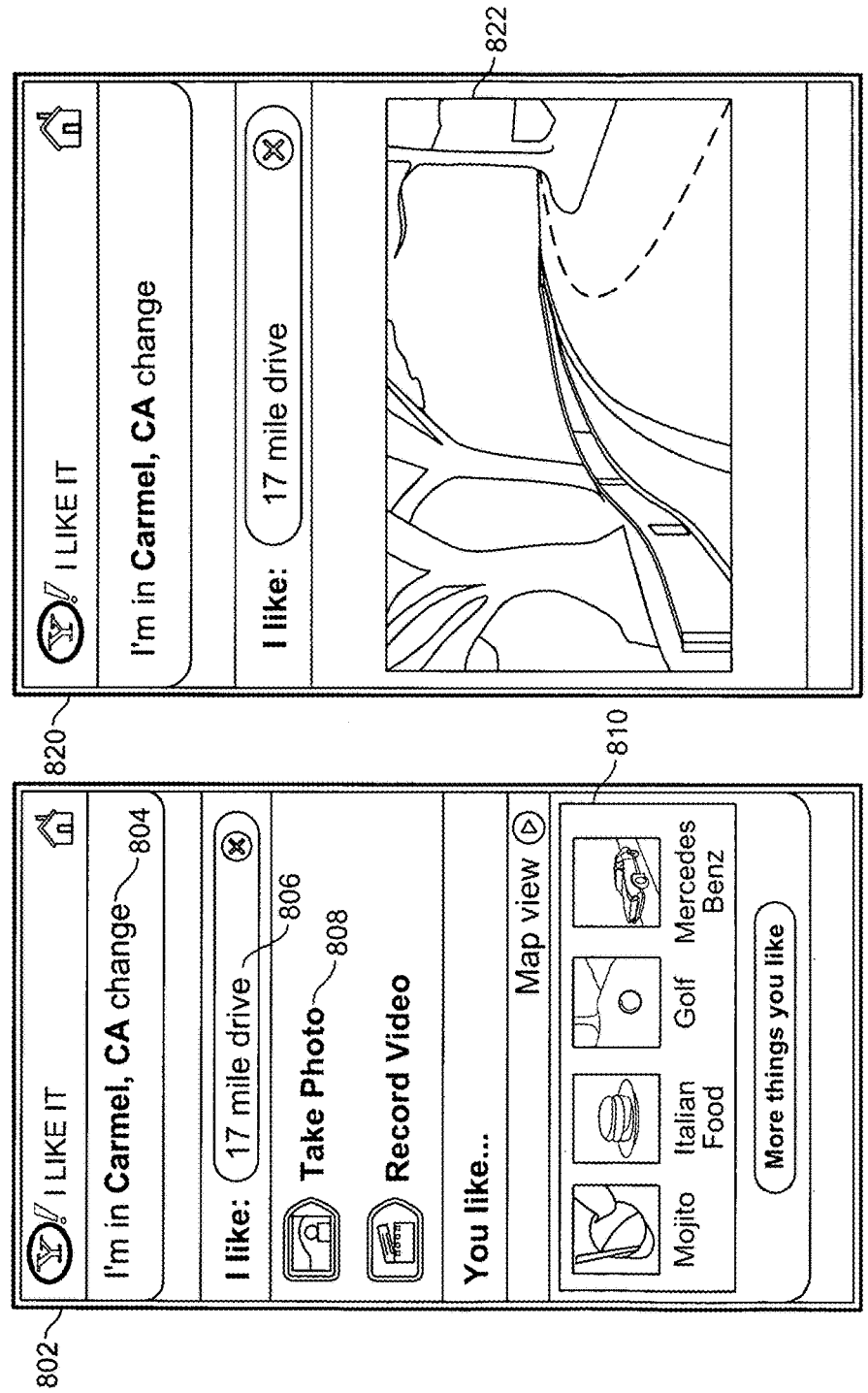
FIGS. 8A-8B illustrate user interfaces for establishing user-location-interest associations in accordance with embodiments of the invention.

FIGS. 8A-8B illustrate user interfaces for establishing user-location-interest associations in accordance with embodiments of the invention. The user interface shown in FIG. 8A allows a user to declare one or more interests to be associated with a location and to attach metadata such as photographs to the association. The user interface 802 displays the user's current location 804, which is Carmel, Calif. in this example. An interest entry component 806 allows a user to declare an interest to be associated with the location. In this example, the user has entered "17 mile drive" as an interest that is related to Carmel, Calif. A "Take Photo" component 808 allows the user to take a photograph, e.g., using a camera attached to the mobile device. The photograph will then be associated with the location Carmel, California and the interest "17 mile drive". The interface 802 also displays other interests of the user as graphical images with text labels in a "You might like" display 810.

The user interface 820 shown in FIG. 8B allows a user to associate a photograph with a location. A photograph 822 is shown and will be associated with the location Carmel, California and the interest "17 mile drive".

Figure 9A:
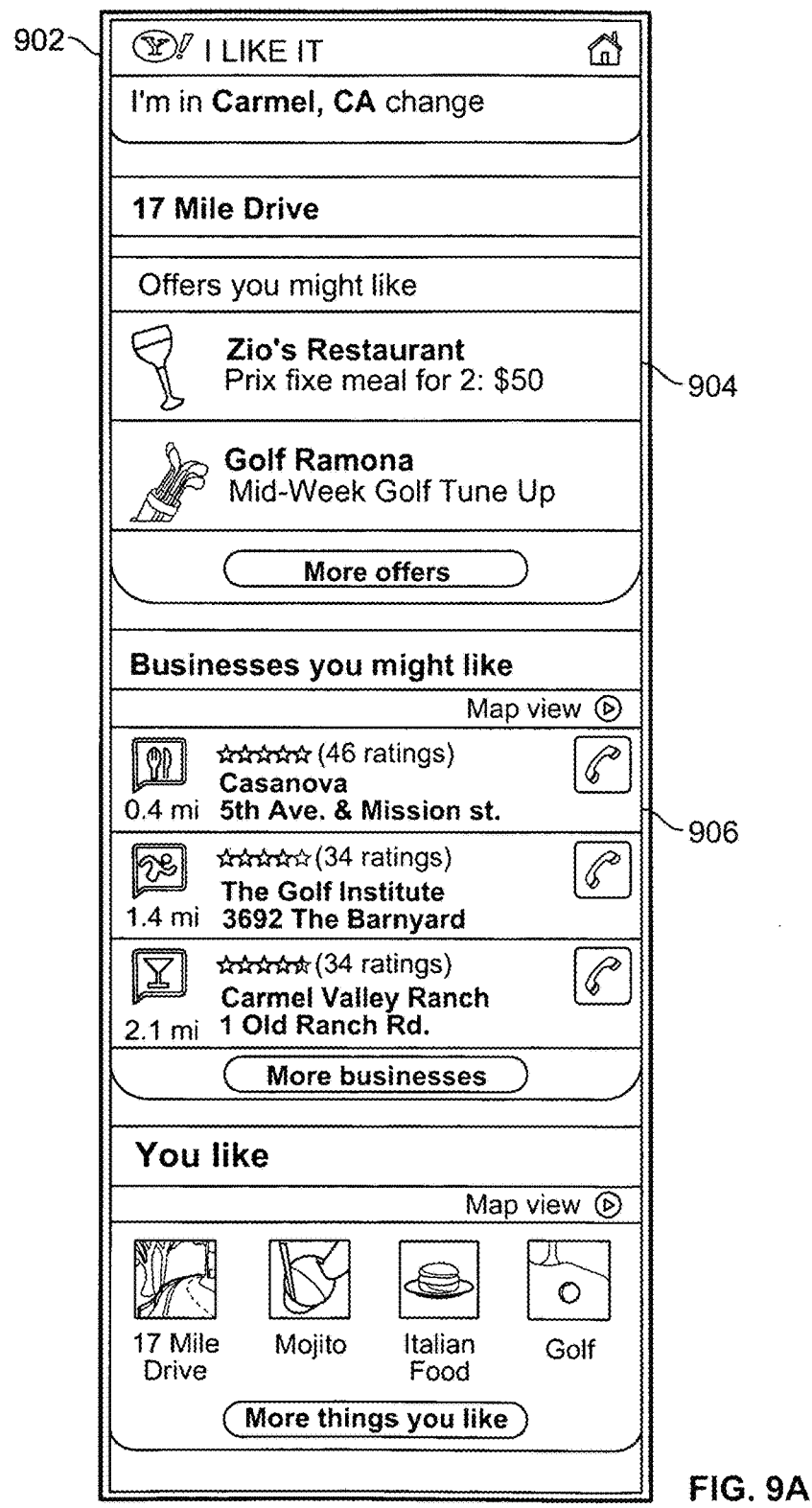

FIGS. 9A and-9B illustrate user interfaces for presenting matching interests in accordance with embodiments of the invention. FIG. 9A shows interests that match the user's declared interests. The term "matching" is used herein to refer to interests that are related or similar to a user's interests. Two matching interests are not necessarily the same interests. For example, an interest in golf may match an interest in a particular golf course.

In one example, the matching interests are determined by selecting interests that other users have associated with the location, and displayed in a user interface 902. For example, other users may have used the interface shown in FIG. 9A to associate Zio's Restaurant, Golf Ramona, Casanova Restaurant, The Golf Institute, and Carmel Valley Ranch with Carmel, Calif. The user interface then displays an "Offers You Might Like" panel 904 for businesses that have made offers, and includes Zio's Restaurant and Golf Ramona in the Offers panel 904. The user interface also displays a "Businesses You Might Like" panel 906, and includes Casanova Restaurant, The Golf Institute, and Carmel Valley Ranch in the Businesses panel 906.

In another example, the matching interests are determined by identifying interests that are related to the user's declared interests and selecting the related interests with the highest strength values, as described above. The selected interests are then displayed in the user interface 902. For example, Zio's Restaurant may be strongly related to the user and location because it serves a type of food that the user has expressed a preference for in an interest profile, and because the restaurant is located in Carmel. Golf Ramona may be strongly related to the user and location because the user is interested in the 17 mile drive, which is located near the Pebble Beach golf course, and an inference is made that golf and golf-related businesses are strongly relevant to the user and location. Zio's Restaurant and Golf Ramona are therefore displayed in the Offers panel 904. In this example, the Casanova Restaurant, The Golf Institute, and Carmel Valley Ranch are strongly related to the user and location through similar logical steps based on the user's interest profile, other locations of interest to the user, and the user's location, and these businesses are therefore displayed in the Businesses panel 906.

The first technique described above, selecting interests from associations created by other users for the same location, may be combined with the second technique, inferring interests based on relevance. For example, an initial set of interests may be generated using the first technique, and the initial set may be expanded using the second technique. In this example, the first technique may produce the interests "golf" and "restaurants" because other users have associated the locations Carmel, Calif. and/or 17 mile drive with golf and restaurants. The second technique may generate the interests Zio's Restaurant, Golf Ramona, Casanova Restaurant, and The Golf Institute.

FIG. 9B shows interests that match the declared interests of people in the user's social network. The interests of other users may be used to generate suggested interests, particularly if the other users are related to the current user. In the example of FIG. 9B, the interests of users in the current user's social network are used to generate suggested interests. The social network is, in one example, a network or graph of users who know each other. In another example, the social network includes the people on the current user's Contacts List, which may be, for example, an online address book. The current user's contacts include a first person who likes the Del Monte Golf Course, and a second person who likes the Monterey Bay Aquarium. The first or second person may have other interests, and the contacts may include other users who like other interests, but the other interests are filtered out because they are not in or near the location specified by the current user (Carmel). Interests may also be filtered out if the interests are not in a defined set of interests, or if the interests are associated with locations that have received little attention, or if the interests are The interests specified by the other users may also be ordered based on a weighting factor, such as the number of people in the current user's network who like the interest, or the distance between the current user and the other users in the social network. In the example of FIG. 9B, the two interests, Del Monte Golf Course and Monterey Bay Aquarium, have been selected for presentation to the current user, and are therefore displayed in a "Your Contacts Like" panel 912. As in the other interfaces described herein, the current user may select one of the interests in the panel 912, e.g., by clicking on the panel, to display more detailed information about the interest.

The user interface 1002 of FIG. 10 displays an advertisement 1008 that is selected based upon the user's interests and the user's location. The user's location, Carmel Calif., is specified in the location input component 1004. The user's interest in the 17 Mile Drive through the Carmel region is specified in the input component 1006. An advertisement that is relevant to the user, the user's location, and the user's interests may therefore be selected using techniques similar to those described above for generating suggested interests. An advertisement may be represented as an interest in the product or service that is the subject of the advertisement, and the advertisement may be stored in a database of interests in the same way that other interests are stored. The techniques described above, i.e., searching other user's interests, and searching for related interests, may therefore be used to find relevant advertisements. In the example of FIG. 10, an advertisement for the PING golf equipment company is represented as an interest in golf. In one example, the user interface 1002 selected the PING advertisement to be displayed because of the user's interest n the 17 Mile Drive, which is located near the Pebble Beach golf course. In another example, there is a store that sells PING golf equipment in Carmel, and the user's interest profile includes golf, so the user interface 1002 selected the PING advertisement 1008 because of the strong relation between the user's location and PING's location, as well as the strong relation between the user's interest in golf and PING's golf products. In one example, the user interfaces described above may be displayed on a mobile device such as a cellular phone, or on a client computer.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 11:
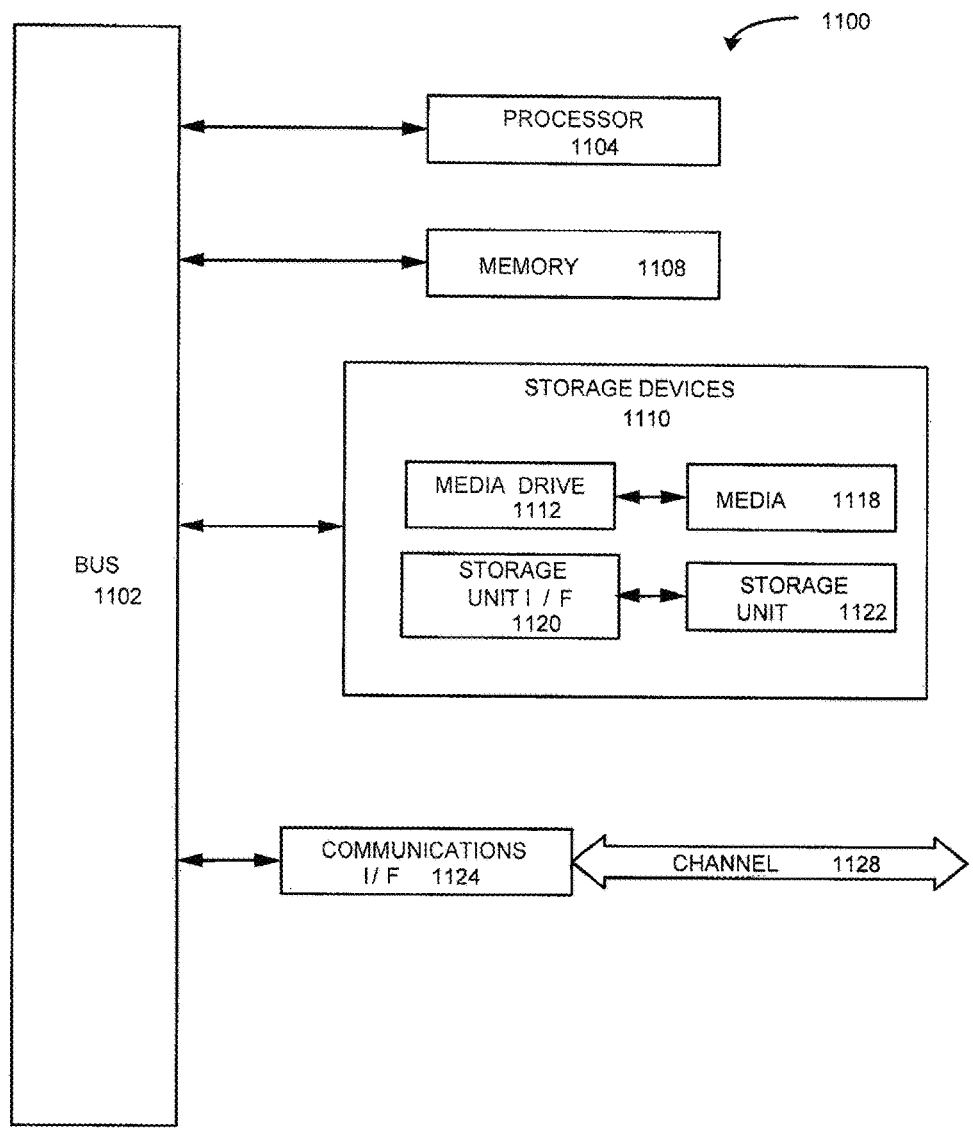
FIG. 11 illustrates a typical computing system that may be employed to implement processing functionality in embodiments of the invention.

FIG. 11 illustrates a typical computing system 1100 that may be employed to implement processing functionality in embodiments of the invention. Computing systems of this type may be used in clients and servers, for example. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special purpose processing engine such as, for example, a microprocessor, microcontroller or other control logic. In this example, processor 1104 is connected to a bus 1102 or other communication medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory ("ROM") or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 1118, may include, for example, a hard disk, floppy disk, magnetic tape, optical disk, CD or DVD, or other fixed or removable medium that is read by and written to by media drive 1114. As these examples illustrate, the storage media 1118 may include a computer-readable storage medium having stored therein particular computer software or data.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a USB port), a PCMCIA slot and card, etc. Software and data transferred via communications interface 1124 are in the form of signals which can be electronic, electromagnetic, optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 1108, storage device 1118, or storage unit 1122. These and other forms of computer-readable media may be involved in storing one or more instructions for use by processor 1104, to cause the processor to perform specified operations. Such instructions, generally referred to as "computer program code" (which may be grouped in the form of computer programs or other groupings), when executed, enable the computing system 1100 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1114, drive 1112 or communications interface 1124. The control logic (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method comprising:
receiving, at a computing device, information related to a plurality of users, said received information comprising data indicating an association between each user, a declared interest by each user and a target object of each user;
compiling, via the computing device, a social network graph between a user and each of the other users within said plurality based on each of their declared interests;
receiving, at the computing device, geographical position information related to the user, the geographic position information indicating at least one real-world location associated with said user;

generating, via the computing device, a user interface (UI) to be transmitted to said user, said UI comprising map information related to the received geographical position information of the user;

communicating, via the computing device, said UI to a device of said user, said communication causing the UI to be displayed on said user device, and further causing the device to transmit updated geographical position information back to the computing device;

monitoring, via the computing device, the received updated geographical position information of the user;

determining, via the computing device, based on said social network graph, strengths of relationships between each of the users of the plurality;

determining, via the computing device, based on said monitoring and said determined relationship strengths, when said updated geographical position information corresponds to at least said target object of the user identified within said received information; and communicating, via the computing device based on said determination, updated map information comprising digital content corresponding to the declared interest of the user.

2. The method of claim 1, wherein said target object is associated with a physical location.

3. The method of claim 1, wherein said declared interest comprises information indicating that said user is interested in said target object.

4. The method of claim 1, wherein said declared interest is based on analysis of a user profile of said user, wherein said analyzed user profile comprises data representing activity of the user that is utilized to identify objects of interest of said user.

5. The method of claim 1, wherein said geographical position information is determined by a Global Positioning System (GPS).

6. The method of claim 1, wherein said geographical position information comprises a route between at least two locations.

7. The method of claim 2, wherein said determination is based on said updated geographical position information being within a predetermined threshold distance to said target object.

8. A non-transitory computer-readable storage medium tangibly encoded with computer-executable instructions, that when executed by a computing device, perform a method comprising:

receiving, at the computing device, information related to a plurality of users, said received information comprising data indicating an association between each user, a declared interest by each user and a target object of each user;

compiling, via the computing device, a social network graph between a user and each of the other users within said plurality based on each of their declared interests;

receiving, at the computing device, geographical position information related to the user, the geographic position information indicating at least one real-world location associated with said user;

generating, via the computing device, a user interface (UI) to be transmitted to said user, said UI comprising map information related to the received geographical position information of the user;

communicating, via the computing device, said UI to a device of said user, said communication causing the UI to be displayed on said user device, and further causing the device to transmit updated geographical position information back to the computing device;

monitoring, via the computing device, the received updated geographical position information of the user;

determining, via the computing device, based on said social network graph, strengths of relationships between each of the users of the plurality;

determining, via the computing device, based on said monitoring and said determined relationship strengths, when said updated geographical position information corresponds to at least said target object of the user identified within said received information; and communicating, via the computing device based on said determination, updated map information comprising digital content corresponding to the declared interest.

9. The non-transitory computer-readable storage medium of claim 8, wherein said target object is associated with a physical location, wherein said determination is based on said updated geographical position information being within a predetermined threshold distance to said target object.

10. The non-transitory computer-readable storage medium of claim 8, wherein said declared interest comprises information indicating that said user is interested in said target object.

11. The non-transitory computer-readable storage medium of claim 8, wherein said declared interest is based on analysis of a user profile of said user, wherein said analyzed user profile comprises data representing activity of the user that is utilized to identify objects of interest of said user.

12. The non-transitory computer-readable storage medium of claim 8, wherein said geographical position information is determined by a Global Positioning System (GPS).

13. The non-transitory computer-readable storage medium of claim 8, wherein said geographical position information comprises a route between at least two locations.

14. A computing device comprising:
a processor;
a non-transitory computer-readable storage medium for tangibly storing thereon program logic for execution by the processor, the program logic comprising:

logic executed by the processor for receiving, at the computing device, information related to a plurality of users, said received information comprising data indicating an association between each user, a declared interest by each user and a target object of each user;

logic executed by the processor for compiling, via the computing device, a social network graph between a user and each of the other users within said plurality based on each of their declared interests;

logic executed by the processor for receiving, at the computing device, geographical position information related to the user, the geographic position information indicating at least one real-world location associated with said user;

logic executed by the processor for generating, via the computing device, a user interface (UI) to be transmitted to said user, said UI comprising map information related to the received geographical position information of the user;

logic executed by the processor for communicating, via the computing device, said UI to a device of said user, said communication causing the UI to be displayed on said user device, and further causing the device to transmit updated geographical position information back to the computing device;

logic executed by the processor for monitoring, via the computing device, the received updated geographical position information of the user;

logic executed by the processor for determining, via the computing device, based on said social network graph, strengths of relationships between each of the users of the plurality;

logic executed by the processor for determining, via the computing device based on said monitoring and said determined relationship strengths, when said updated geographical position information corresponds to at least said target object of the user identified within said received information; and logic executed by the processor for communicating, via the computing device based on said determination, updated map information comprising digital content corresponding to the declared interest.

* * * * *